(12) United States Patent
Kitajima

(10) Patent No.: US 11,037,279 B2
(45) Date of Patent: Jun. 15, 2021

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Kotaro Kitajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/170,203

(22) Filed: Oct. 25, 2018

(65) Prior Publication Data

US 2019/0130544 A1    May 2, 2019

(30) Foreign Application Priority Data

Oct. 31, 2017  (JP) .............................. JP2017-211209
Oct. 19, 2018  (JP) .............................. JP2018-197847

(51) Int. Cl.
*G06T 5/00*     (2006.01)
*H04N 5/232*   (2006.01)

(52) U.S. Cl.
CPC .............. *G06T 5/008* (2013.01); *G06T 5/002* (2013.01); *H04N 5/232* (2013.01); *G06T 2207/10024* (2013.01); *G06T 2207/20208* (2013.01); *G06T 2207/30196* (2013.01); *G06T 2207/30201* (2013.01)

(58) Field of Classification Search
CPC . G06T 2207/10024; G06T 2207/20208; G06T 2207/30201; G06T 5/002; G06T 5/008; G06T 2207/30196; G06T 2207/20012; H04N 5/232; H04N 5/60; H04N 5/642; H04N 5/645; H04N 5/655; H04N 5/23218; H04N 5/23219; H04R 1/023; H04R 1/026; H04R 1/028; H04R 2499/15; G06K 9/00221; G06K 9/2027; G06K 9/4661

See application file for complete search history.

(56) References Cited

U.S. PATENT DOCUMENTS

2007/0273686 A1* 11/2007 Watanabe ............. G06T 15/506
                                                    345/419
2016/0364602 A1* 12/2016 Kim ........................ G06T 15/50

FOREIGN PATENT DOCUMENTS

JP           2016-086246 A       5/2016

\* cited by examiner

*Primary Examiner* — Said M Elnoubi
(74) *Attorney, Agent, or Firm* — Cowan, Liebowitz & Latman, P.C.

(57) ABSTRACT

There is provided an image processing apparatus. A compositing unit performs compositing processing for compositing a first reflection characteristic data that shows a reflection characteristic of a first virtual light source on a predetermined object and a second reflection characteristic data that shows a reflection characteristic of a second virtual light source on the predetermined object. A generation unit generates a reflection component relating to an object that is included in an image, based on a reflection characteristic shown by composited reflection characteristic data obtained by the compositing processing. An addition unit adds the reflection component to the image.

13 Claims, 13 Drawing Sheets

OBLIQUE LIGHT CORRECTION MODE

TOP LIGHT CORRECTION MODE

BACK LIGHT CORRECTION MODE

FLAT CORRECTION MODE

FIG. 7

| | OBLIQUE LIGHT CORRECTION MODE | TOP LIGHT CORRECTION MODE | BACK LIGHT CORRECTION MODE | FLAT CORRECTION MODE |
|---|---|---|---|---|
| | REDUCE LIGHT FROM 60 DEGREES ON BRIGHT SIDE | REDUCE LIGHT FROM TOP SIDE | INCREASE LIGHT FROM FRONT | NO STROBE EMISSION: INCREASE/REDUCE LIGHT DIAGONALLY |
| | INCREASE LIGHT FROM 60 DEGREES ON DARK SIDE | INCREASE LIGHT FROM BOTTOM SIDE | INCREASE LIGHT FROM BOTTOM SIDE | $\alpha \times (L60)$ OR $\alpha \times (R60)$ |
| | | | | STROBE EMISSION PRESENT: REDUCE LIGHT FROM FRONT INCREASE LIGHT FROM TOP SIDE |
| PROCESSING | $\alpha \times (R60) - \beta \times (L60)$ OR $\alpha \times (R60) - \beta \times (L60)$ | $\alpha \times (Up60) - \beta \times (Down60)$ | $\alpha \times (F0) + \beta \times (Down60)$ | $\alpha \times (Up60) - \beta \times (F0)$ |

F I G. 12
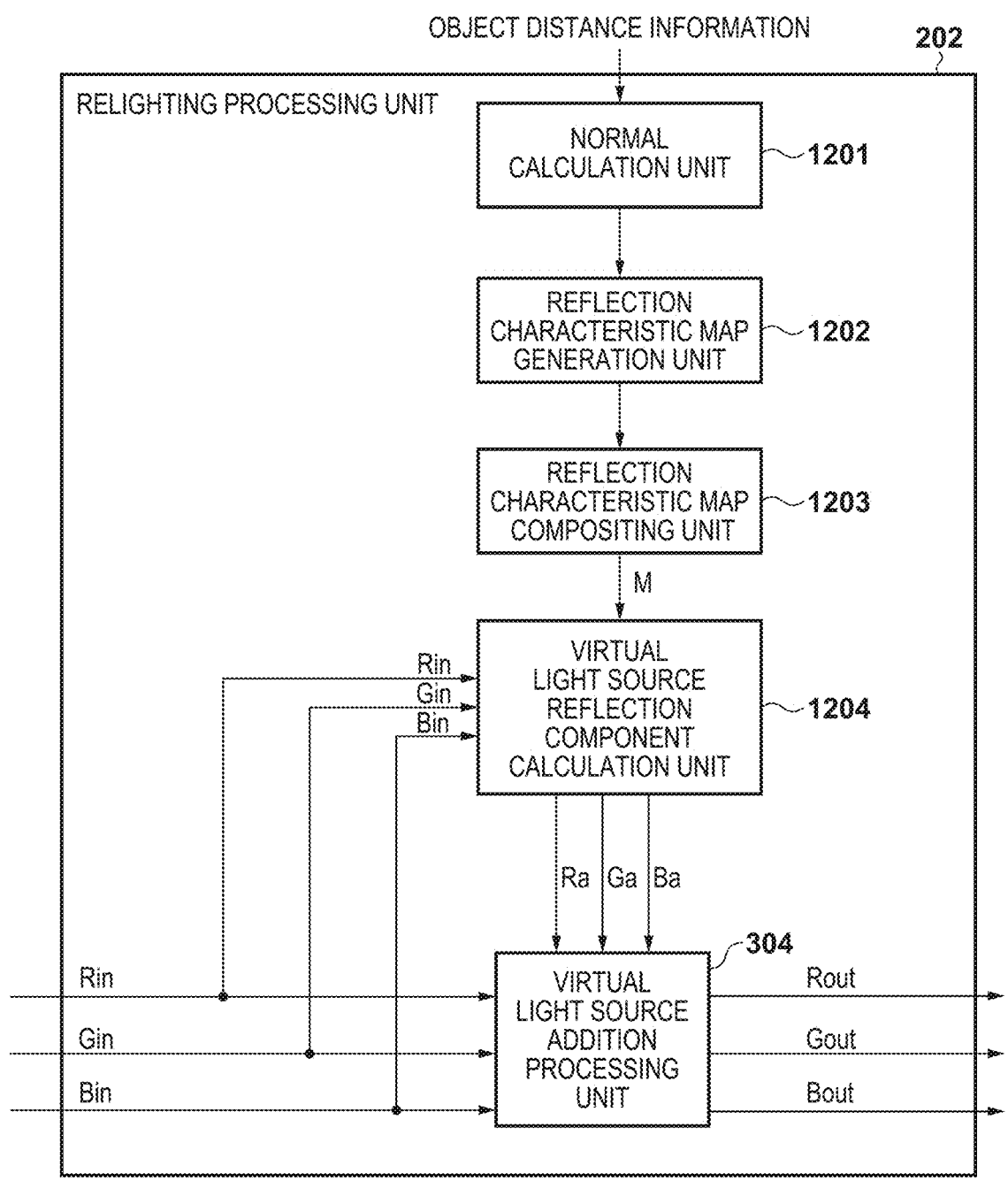

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

Conventionally, in photography, regions of light and shadow that occur on an object are adjusted by adjusting the light by means of supplemental lighting, a reflector board, and the like. Through this, image photography in which the impression of the object can be changed in various ways becomes possible. Also, there is a technique (relighting) that adds highlight and shadow components caused by the reflection of light to an object region, as a technique in which these light adjustments are performed after photography. In this way, it becomes possible to correct dark parts and to generate an image that has an enhanced stereoscopic effect.

Japanese Patent Laid-Open No. 2016-86246 discloses a technique for acquiring distance information of an object, deriving shape information of the object based on the distance information, and processing the captured image based on the shape information, distance information and the position of a virtual light source to generate an image in which light from the virtual light source is irradiated on the object.

In Japanese Patent Laid-Open No. 2016-86246, a normal is calculated from the distance information of the object, reflection characteristics due to a virtual light source are derived based on the normal, the object distance, and the position, direction and intensity of the virtual light source, and a relighting control is performed. With this method, calculating the object distance, the normal, and the reflection characteristics due to the virtual light source involves a high degree of computational complexity, and processing takes time. In particular, if the number of virtual light sources is increased and irradiation is performed by a plurality of lamps, the computations need to be repeated for the number of virtual light sources, and thus processing time increases.

SUMMARY OF THE INVENTION

The present invention has been made in view of such circumstances, and provides a technique to reduce the processing load of relighting that uses a plurality of virtual light sources.

According to a first aspect of the present invention, there is provided an image processing apparatus comprising: at least one processor and/or circuit configured to function as following units: a compositing unit configured to perform compositing processing for compositing a first reflection characteristic data that shows a reflection characteristic of a first virtual light source on a predetermined object and a second reflection characteristic data that shows a reflection characteristic of a second virtual light source on the predetermined object; a generation unit configured to generate a reflection component relating to an object that is included in an image, based on a reflection characteristic shown by composited reflection characteristic data obtained by the compositing processing; and an addition unit configured to add the reflection component to the image.

According to a second aspect of the present invention, there is provided an image capturing apparatus comprising: the image processing apparatus according to the first aspect; and an image capturing unit configured to generate the image.

According to a third aspect of the present invention, there is provided an image processing method executed by an image processing apparatus, comprising: performing compositing processing for compositing a first reflection characteristic data that shows a reflection characteristic of a first virtual light source on a predetermined object and a second reflection characteristic data that shows a reflection characteristic of a second virtual light source on the predetermined object; generating a reflection component relating to an object that is included in an image, based on a reflection characteristic shown by composited reflection characteristic data obtained by the compositing processing; and adding the reflection component to the image.

According to a fourth aspect of the present invention, there is provided a non-transitory computer-readable storage medium which stores a program for causing a computer to execute an image processing method comprising: performing compositing processing for compositing a first reflection characteristic data that shows a reflection characteristic of a first virtual light source on a predetermined object and a second reflection characteristic data that shows a reflection characteristic of a second virtual light source on the predetermined object; generating a reflection component relating to an object that is included in an image, based on a reflection characteristic shown by composited reflection characteristic data obtained by the compositing processing; and adding the reflection component to the image.

Further features of the present invention will become apparent from the following description of exemplary embodiments with reference to the attached drawings.

BRIEF DESCRIPTION OF THE DRAWINGS

FIG. 7 is a diagram illustrating the relationship between the reflection characteristic maps which are used and the relighting mode.

FIG. 12 is a block diagram showing a configuration of the relighting processing unit 202 according to a third embodiment.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

In the following embodiments, description will be given taking a configuration in which an image processing apparatus is applied to a digital camera (image capturing apparatus) as an example.

First Embodiment

Figure 1:
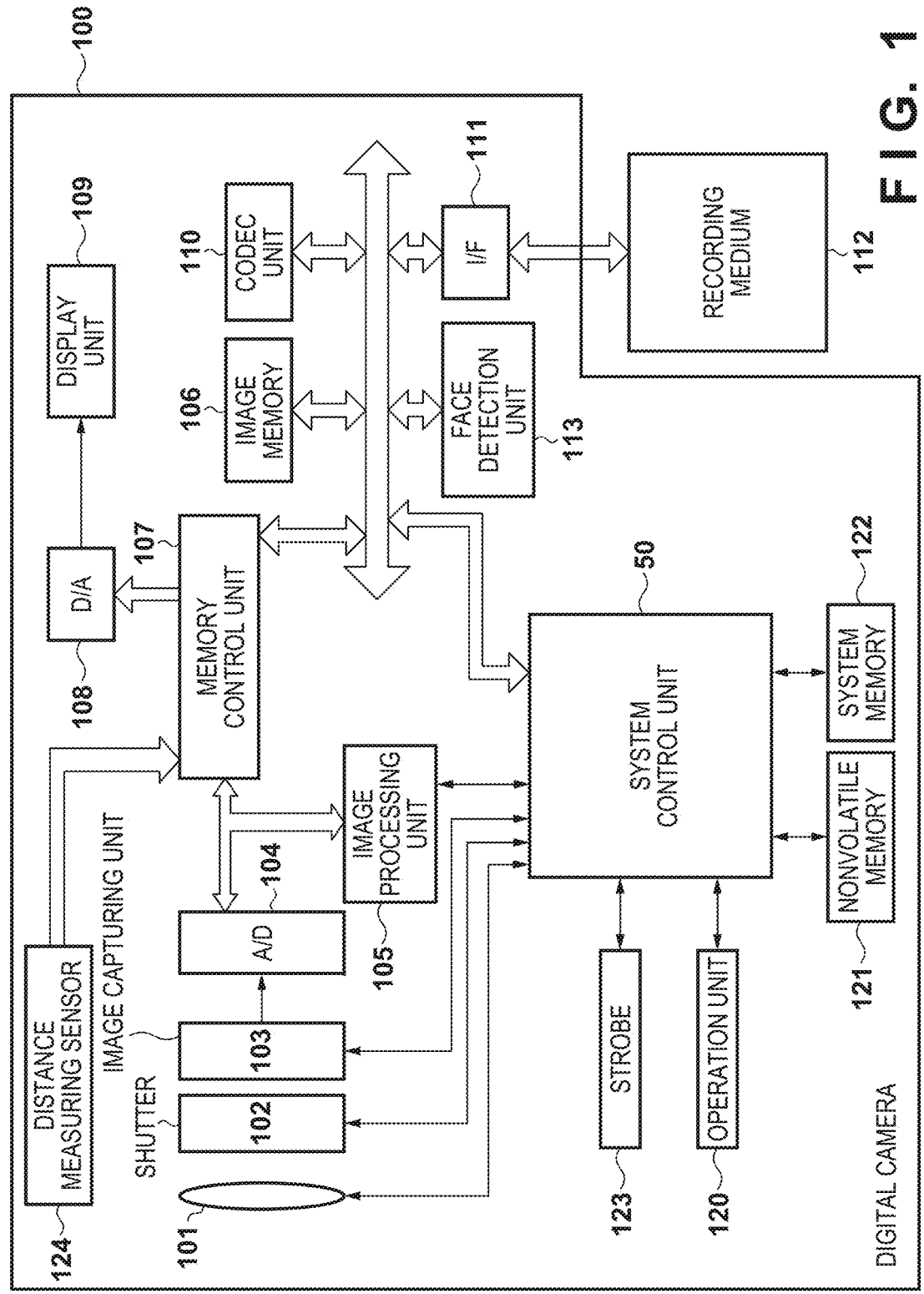
FIG. 1 is a block diagram showing a configuration of a digital camera 100.

FIG. 1 is a block diagram showing a configuration of a digital camera 100. In FIG. 1, reference numeral 101 denotes a group of lenses that includes a zoom lens and a focus lens. Reference numeral 102 denotes a shutter that has a diaphragm function. Reference numeral 103 denotes an image capturing unit that is constituted by a CCD or CMOS device or the like that converts an optical image into an electrical signal. Reference numeral 104 denotes an A/D converter that converts an analog signal into a digital signal. Reference numeral 105 denotes an image processing unit that performs various types of image processing, such as white balance processing, relighting processing, gamma processing, edge enhancement processing, and color correction processing on the image data output by the A/D converter 104. Reference numeral 106 denotes an image memory. Reference numeral 107 denotes a memory control unit that controls the image memory 106. Reference numeral 108 denotes a D/A converter that converts an input digital signal into an analog signal. Reference numeral 109 denotes a display unit that includes an LCD and the like. Reference numeral 110 denotes a codec unit that compression encodes and decodes image data.

Reference numeral 111 denotes an interface (I/F) with a recording medium 112. Reference numeral 112 denotes a recording medium such as a memory card or a hard disk. Reference numeral 113 denotes a face detection unit that detects regions of a captured image in which a face appears. Reference numeral 50 denotes a system control unit that controls the overall system of the digital camera 100. Reference numeral 121 denotes a nonvolatile memory such as an EEPROM that stores programs, parameters, and the like. Reference numeral 122 denotes a system memory to which constants, variables, programs read out from the nonvolatile memory 121, and the like for use in operations by the system control unit 50 are extracted. Reference numeral 123 denotes a strobe (light source apparatus). Reference numeral 124 denotes a distance measuring sensor that measures distance to the object.

The following describes the basic operations of the digital camera 100, which is configured as described above, when capturing an object. The image capturing unit 103 photoelectrically converts light that is incident via the lens 101 and the shutter 102 and outputs the resultant analog signal to the A/D converter 104 as an input image signal. The A/D converter 104 converts the analog image signal output from the image capturing unit 103 into a digital image signal, and outputs the digital image signal to the image processing unit 105. Note that the digital image signal may be recorded to the recording medium 112 as raw image data.

The image processing unit 105 performs color conversion processing such as white balance, relighting processing, gamma processing, edge enhancement processing, and the like on the image data from the A/D converter 104 or on the image data from the memory control unit 107. Also, the image processing unit 105 performs predetermined evaluation value calculation processing with use of the face detection results from the face detection unit 113 and the captured image data. The system control unit 50 performs exposure control and distance measurement control based on the obtained evaluation value. Through this, AF (auto focus) processing, AE (auto exposure) processing and AWB (auto white balance) processing and the like that employ a TTL (Through The Lens) system can be performed.

The image data output from the image processing unit 105 is written to the image memory 106 via the memory control unit 107. The image memory 106 stores image data that is output from the image capturing unit 103 and image data for displaying on the display unit 109. The D/A converter 108 converts data for use in image display that is stored in the image memory 106 into an analog signal and supplies the analog signal to the display unit 109. The display unit 109 performs display on a display device such as an LCD, according to the analog signal from the D/A converter 108.

The codec unit 110 compression encodes the image data recorded to the image memory 106 based on a standard such as JPEG or MPEG. The system control unit 50 stores the encoded image data in the recording medium 112 via the I/F 111.

The above describes the basic operation at the time of image capture of an object. Other than the basic operations described above, the system control unit 50 realizes various processing of the present embodiment, which will be described later, by executing programs recorded in the nonvolatile memory 121. The programs referred to here are programs for executing various flowcharts that will be described later in the present embodiment. At this time, constants, variables, programs read out from the nonvolatile memory 121, and the like for use in operations by the system control unit 50 are extracted to the system memory 122.

Figure 2:
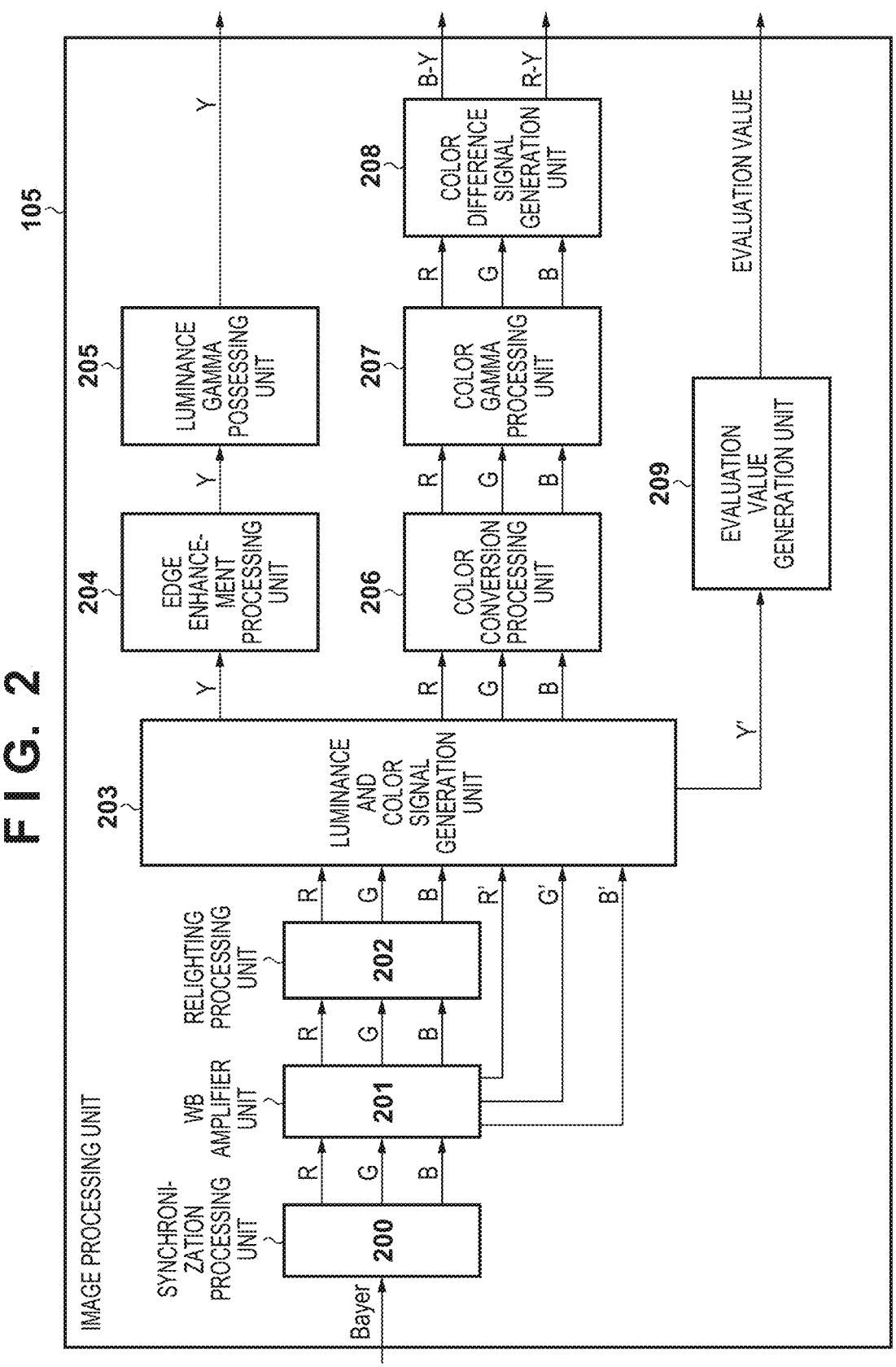
FIG. 2 is a block diagram showing a configuration of an image processing unit 105.

Next, the image processing unit 105 will be described in detail, with reference to FIG. 2. FIG. 2 is a block diagram showing a configuration of the image processing unit 105. In FIG. 2, reference numeral 200 denotes a synchronization processing unit, 201 denotes a WB amplification unit, 202 denotes a relighting processing unit, and 203 denotes a luminance and color signal generation unit. Reference numeral 204 denotes an edge enhancement processing unit, 205 denotes a luminance gamma possessing unit, 206 denotes a color conversion processing unit, 207 denotes a color gamma processing unit, 208 denotes a color difference signal generation unit and 209 denotes an evaluation value generation unit.

The following describes operation in the image processing unit 105. The image signal that is output from the A/D converter 104 in FIG. 1 is input to the image processing unit 105. The image signal that is input to the image processing unit 105 is input to the synchronization processing unit 200. The synchronization processing unit 200 performs synchronization processing on the input image data that is in RGB Bayer array format, and generates color signals R, G and B.

The WB amplification unit 201 applies gain to the RGB color signals based on a white balance gain value calculated by the system control unit 50, and adjusts the white balance. The WB amplification unit 201 inputs the white balance-adjusted RGB signals to the relighting processing unit 202. Also, the WB amplification unit 201 inputs the white balance-adjusted RGB signals to the luminance and color signal generation unit 203 as R'G'B' signals to be used in generating a luminance signal Y' that is used to generate an evaluation value that will be described later.

The relighting processing unit 202, after implementing relighting processing that will be described later on input RGB signals, outputs the RGB signals to the luminance and color signal generation unit 203. The luminance and color signal generation unit 203 generates a luminance signal Y from the RGB signals, and respectively outputs the generated luminance signal Y to the edge enhancement processing unit 204 and the color signals RGB to the color conversion processing unit 206. Also, the luminance and color signal generation unit 203 generates the luminance signal Y' from the R'G'B' signals that are input from the WB amplification unit 201, and inputs the generated luminance signal Y' to the evaluation value generation unit 209.

The edge enhancement processing unit 204 performs edge enhancement processing on the luminance signal Y, and outputs the processed luminance signal Y to the luminance gamma possessing unit 205. The luminance gamma possessing unit 205 performs gamma correction on the luminance signal Y. and outputs the luminance signal Y to the image memory 106. The color conversion processing unit 206 performs desired color balance conversion by matrix computation on the RGB signals, and the like. The color gamma processing unit 207 performs gamma correction on the RGB color signals. The color difference signal generation unit 208 generates color difference signals R-Y and B-Y from the RGB signals, and outputs the color difference signals to the image memory 106. The image signals (Y, R-Y, B-Y) that are output to the image memory 106 are compression-encoded by the codec unit 110 and recorded to the recording medium 112.

The evaluation value generation unit 209 generates an evaluation value for estimating the state of an actual ambient light source. The state of an ambient light source in the present embodiment is the direction and intensity (luminance) of the ambient light source with respect to the object. Accordingly, the evaluation value generation unit 209 generates and outputs an evaluation value for estimating the direction and intensity of an ambient light source. Specifically, the evaluation value generation unit 209 divides an image into a plurality of blocks as shown in FIGS. 5A to 5D, and calculates an average luminance value for each block. The evaluation value generation unit 209 records the calculated evaluation value to the system memory 122.

Figure 3:
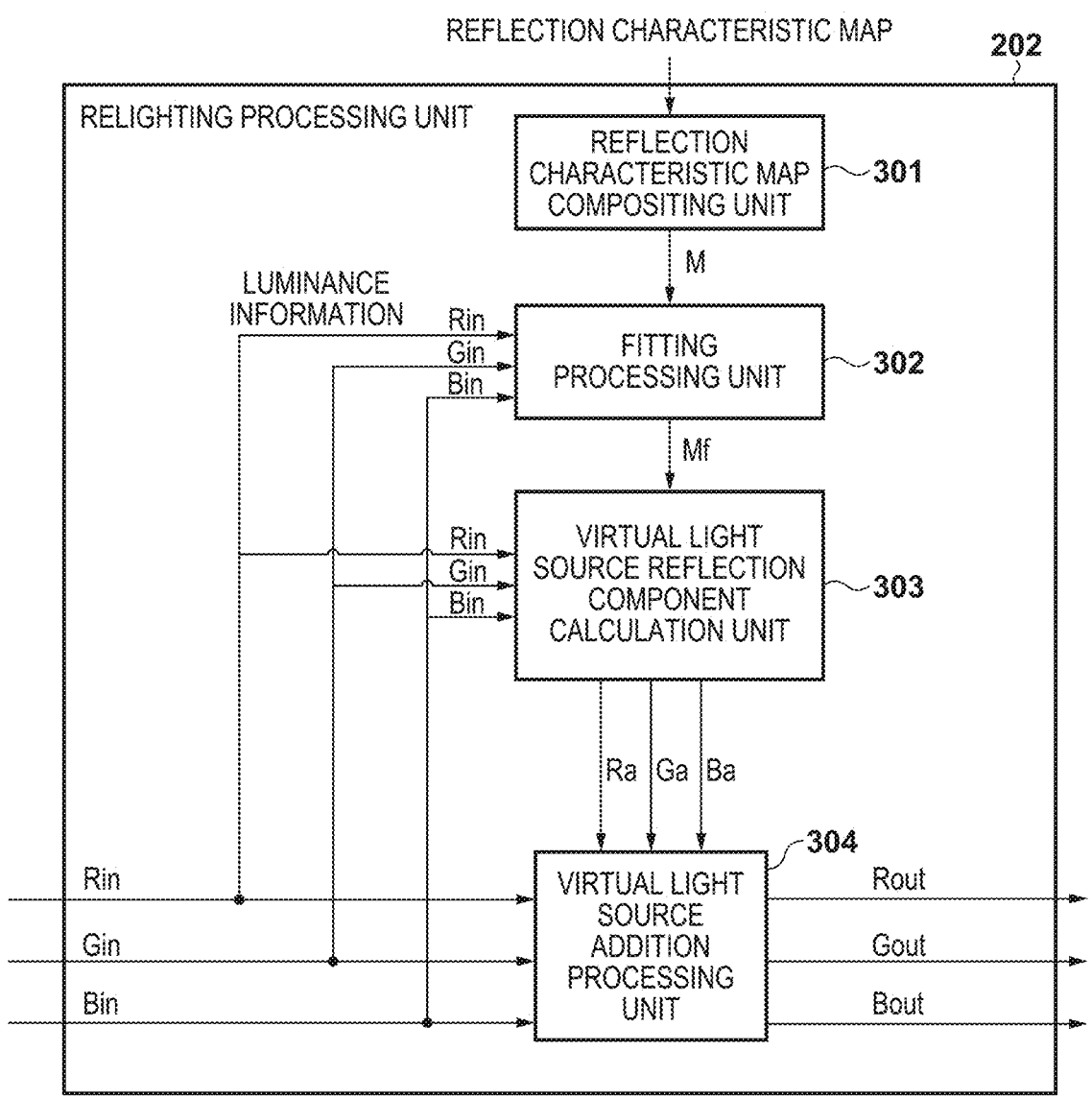
FIG. 3 is a block diagram showing a configuration of a relighting processing unit 202.

Next, a configuration and operations of the relighting processing unit 202 will be described, with reference to FIG. 3. FIG. 3 is a block diagram showing the configuration of the relighting processing unit 202. In FIG. 3, reference numeral 301 denotes a reflection characteristic map compositing unit that loads and composites a plurality of reflection characteristic maps each showing the characteristics of a virtual light source reflected by an object (reflection characteristics of the virtual light source with respect to the object). Reference numeral 302 denotes a fitting processing unit that adapts the reflection characteristic map of the virtual light source to the object. Reference numeral 303 denotes a virtual light source reflection component calculation unit that calculates color components (virtual light source reflection components) reflected by the object based on the reflection characteristic map. Reference numeral 304 denotes a virtual light source addition processing unit that adds the virtual light source reflection components to the input image. The following is a detailed description of the operations of the units of the relighting processing unit 202.

The reflection characteristic map compositing unit 301 loads and composites a plurality reflection characteristic maps of virtual light sources that were prepared in advance (described in detail later). In this processing for compositing a plurality of reflection characteristic maps, the system control unit 50 determines which of the reflection characteristic maps to load and determines the compositing parameters.

Figure 4:
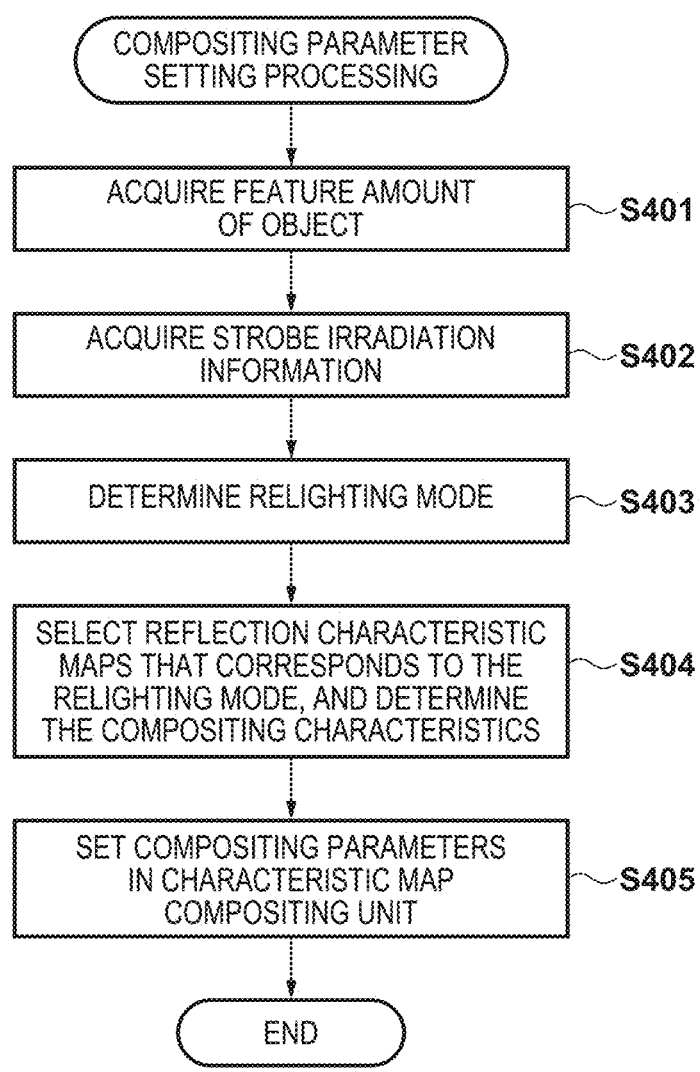
FIG. 4 is a flowchart of compositing parameter setting processing that is performed for a reflection characteristic map compositing unit 301 by a system control unit 50, according to a first embodiment.

The following describes compositing parameter setting processing that is executed for the reflection characteristic map compositing unit 301 by the system control unit 50, with reference to FIG. 4. The processing of the flowchart in FIG. 4 starts when image capture of an object is performed.

In step S401, the system control unit 50 acquires feature amounts of the captured object. Specifically, the system control unit 50 acquires the average luminance value of each block of the image generated by the evaluation value generation unit 209 (FIG. 2). FIGS. 5A to 5D show an example of block division. The evaluation value generation unit 209 calculates the average luminance value of the object for each divided block as shown in FIGS. 5A to 5D, and the system control unit 50 acquires the calculated average luminance value.

In step S402, the system control unit 50 acquires the strobe irradiation information at the time of image capture. The strobe irradiation information is information that shows whether or not the strobe 123 emitted light at the time of image capture.

Figure 5A:
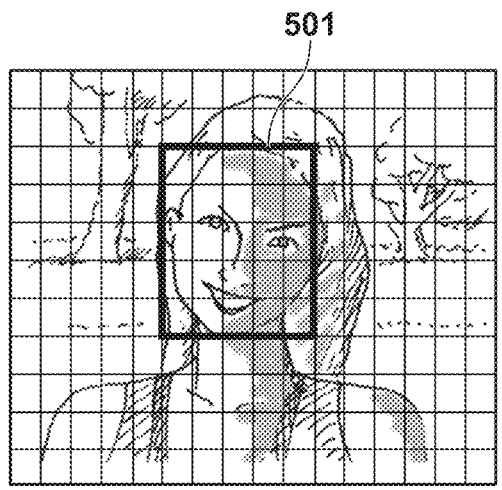
FIGS. 5A to 5D are diagrams showing relighting modes according to the luminance of an object.
Figure 5B:
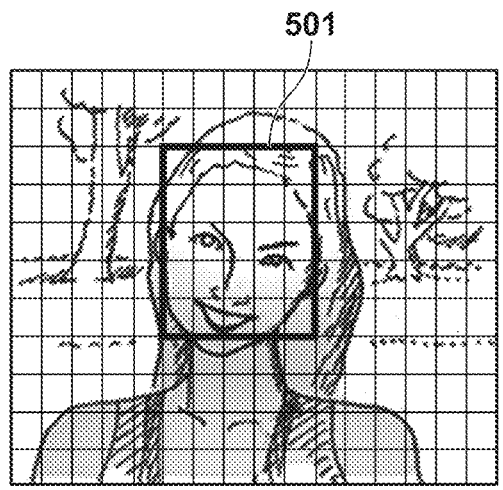
Figure 5C:
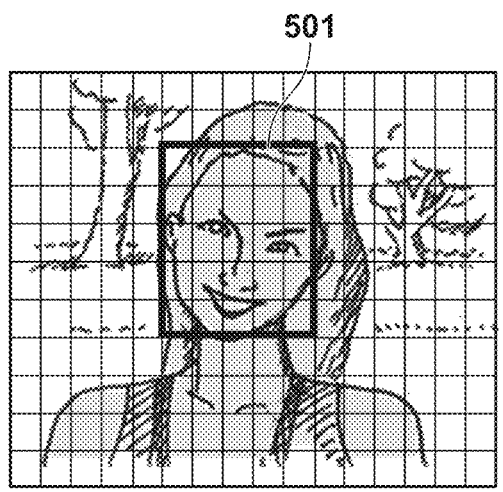
Figure 5D:
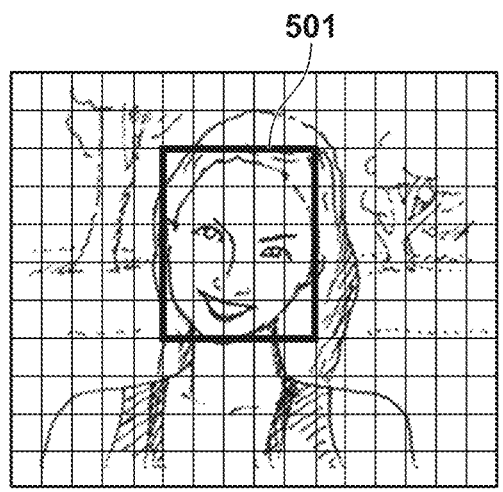

In step S403, the system control unit 50 determines a relighting mode according to the feature amounts of object that are acquired in step S401. The present embodiment describes an example in which there are four different relighting modes, namely (1) an oblique light correction mode, (2) a top light correction mode, (3) a back light correction mode, and (4) a flat correction mode. Firstly, the system control unit 50 acquires information about a facial region detected by the face detection unit 113 in the captured image. For example, the system control unit 50 acquires information about a facial region 501 (see FIGS. 5A to 5D) from the face detection unit 113. Next, the system control unit 50 acquires the object feature amount of each block included in the facial region 501, out of the object feature amounts of the blocks acquired in step S401. The system control unit 50 analyses the distribution of the object feature amounts (luminance) in the facial region 501, and determines if the distribution corresponds to any of the diagrams shown in FIGS. 5A to 5D. If there is a brightness difference between the left and right of the facial region 501 as shown in FIG. 5A, the system control unit 50 selects the oblique light correction mode. If there is a brightness difference between the top and bottom of the facial region 501 and the upper side is brighter as shown in FIG. 5B, the system control unit 50 selects the top light correction mode. If there is little brightness difference in the facial region 501 and the facial region 501 is darker than other regions as shown in FIG. 5C, the system control unit 50 selects the back light correction mode. If there is little brightness difference in the facial region 501 and the facial region 501 is sufficiently bright as shown in FIG. 5D, the system control unit 50 selects the flat correction mode. Note that, in FIG. 5A, a state in which the left side of the facial region 501 is bright and the right side is dark is shown, but the oblique light correction mode is also selected if the left side of the facial region 501 is dark and the right side is bright. If the distribution of the object feature amounts (luminance) in the facial region 501 corresponds to none of the above four relighting modes, the system control unit 50 determines not to perform image correction by relighting.

Figure 6:
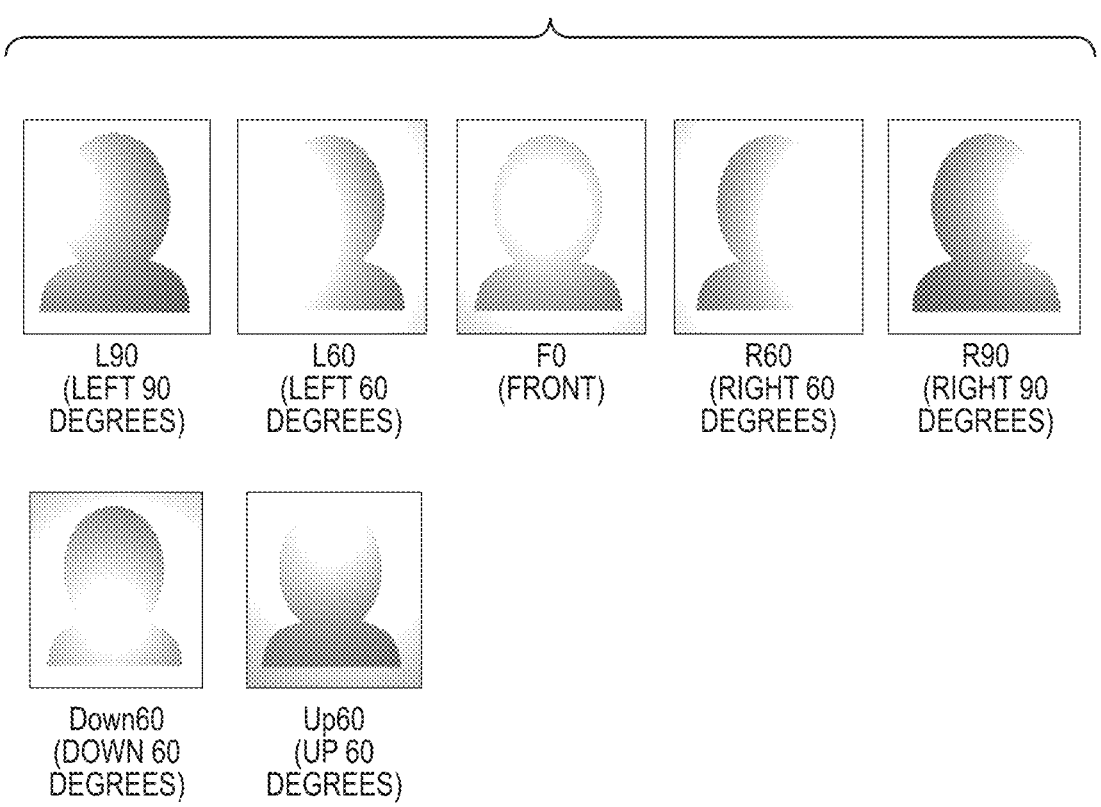
FIG. 6 is a diagram showing reflection characteristic maps.

In step S404, the system control unit 50 selects reflection characteristic maps (reflection characteristic data) that corresponds to the relighting mode determined in step S403, and determines the compositing characteristics of the selected reflection characteristic maps. A reflection characteristic map is an image that shows the reflection characteristics resulting from relighting an average facial shape model from a predetermined light source position. Examples of reflection characteristic maps are shown in FIG. 6. The top row in FIG. 6 shows reflection characteristic maps in which the position of the light source is changed from left side 90 degrees (L90) through to right side 90 degrees (R90). The bottom row in FIG. 6 show reflection characteristic maps in cases where the position of a light source is set at 60 degrees on the lower side (Down60) and at 60 degrees on the upper side (Up60). Such reflection characteristic maps are generated beforehand based on an average facial shape model and recorded to the nonvolatile memory 121 (FIG. 1).

The following describes the relationship between the reflection characteristic maps which are used and the relighting mode, with reference to FIG. 7. In an example shown in FIG. 7, if the relighting mode is the "oblique light correction mode", the left and right of the object are compared and a virtual light source is irradiated from a 60 degree angle towards the dark side. Also, light is reduced from a 60 degree angle towards the bright side. In the example shown in FIG. 5A, the right side when facing the object is dark and the left side is bright. For this reason, the reflection characteristic map in a case where a virtual light source is irradiated from 60 degrees on the right side (R60), and the reflection characteristic map in a case where a virtual light source is irradiated from 60 degrees on the left side (L60) are composited in accordance with the following equation (1).

$$M=\alpha \times (R60) - \beta \times (L60) \tag{1}$$

Figure 8A:
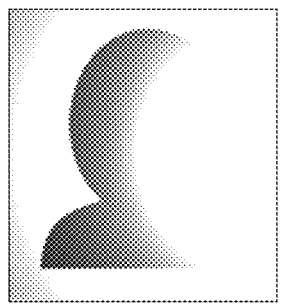
FIGS. 8A to 8D are diagrams showing composited reflection characteristic maps.

Here, M is a composited reflection characteristic map, and α and β are coefficients (compositing characteristics) at the time of compositing and take a value from 0 to 1. The system control unit 50 sets α to a larger value as the dark part of the face becomes darker relative to a predetermined reference luminance of a face and sets β to a larger value as the bright part of the face becomes brighter relative to the reference luminance. Light reduction is indicated due to the β term being negative. A composited reflection characteristic map is shown in FIG. 8A. A composited reflection characteristic map (composite reflection characteristic data) has the data format of an image (reflection characteristic image) that shows the reflection characteristic in each position of the object. In FIG. 8A, portions brighter than the reference gradation (128 in the case of 8 bits, for example) indicate added light, and darker portions indicate subtracted light (the same applies to FIGS. 8B to 8D).

In contrast to FIG. 5A, if the left side is dark and the right side is bright when facing the object, the right and left of the reflection characteristic map used in the equation (1) are reversed. That is, the reflection characteristic map in the case where a virtual light source is irradiated from 60 degrees on the left side (L60) and the reflection characteristic map in the case where a virtual light source is irradiated from 60 degrees on the right side (R60) are composited in accordance with the following equation (2).

$$M=\alpha \times (L60) - \beta \times (R60) \tag{2}$$

In the equation (2), the system control unit 50 sets α to a larger value as the dark part of the face becomes darker relative to a predetermined reference luminance of a face, and sets β to a larger value as the bright part of the face becomes brighter relative to the reference luminance.

Next, the case where the relighting mode is the "top light correction mode" will be described. In this case, as shown in FIG. 5B, the area near the head region of the object is bright, and the face becomes darker from the mouth down. Thus, the light which falls on the face is balanced by reducing the light from the upper side of the object, and irradiating added light from the lower side. That is, a reflection characteristic map in a case where a virtual light source is irradiated from 60 degrees on the upper side (Up60) and a reflection characteristic map in a case where a virtual light source is irradiated from 60 degrees on the lower side (Down60) are composited in accordance with the following equation (3).

$$M=\alpha \times (\mathrm{Down}60) - \beta \times (\mathrm{Up}60) \tag{3}$$

Figure 8B:
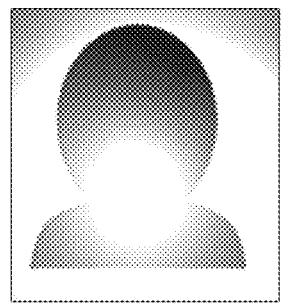

A composited reflection characteristic map in this case is shown in FIG. 8B. Note that, in the equation (3), the system control unit 50 sets α to a larger value as the dark part of the face becomes darker relative to a predetermined reference luminance of a face, and sets β to a larger value as the bright part of the face becomes brighter relative to the reference luminance.

If the relighting mode is the "back light correction mode", virtual light sources of added light are irradiated from the front and the lower front of the face, since the entire face is dark. That is, the reflection characteristic map in the case where a virtual light source is irradiated from the front (F0) and the reflection characteristic map in the case where a virtual light source is irradiated from 60 degrees on the lower side (Down60) are composited in accordance with the following equation (4).

$$M=\alpha \times (F0) + \beta \times (\mathrm{Down}60) \tag{4}$$

Figure 8C:
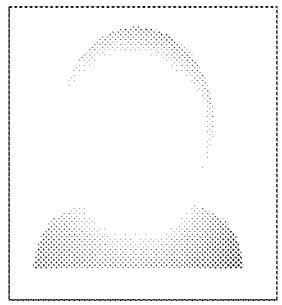

A composited reflection characteristic map in this case is shown in FIG. 8C. Note that, in the equation (4), the system control unit 50 sets α and β to larger values as the facial region 501 becomes darker relative to a predetermined reference luminance of a face.

If the relighting mode is the "flat correction mode" and there is no strobe emission, a virtual light source is irradiated from a 60 degree angle from either the right or left. In this case, compositing of reflection characteristic maps is not performed, and only gain adjustment is performed as shown in an equation (5).

$$M=\alpha \times (L60 \text{ or } R60) \tag{5}$$

Note that, in the equation (5), the system control unit 50 sets α to a larger value as the facial region 501 becomes darker relative to a predetermined reference luminance of a face.

In a case where the relighting mode is the "flat correction mode" and there is strobe emission, light from the front is reduced and a virtual light source is irradiated from the upper front side, in order to cancel out the light from the strobe. Specifically, the reflection characteristic map in the case where a virtual light source is irradiated from the front (F0), and a reflection characteristic map in a case where a virtual light source is irradiated from 60 degrees on the upper side (Up60) are composited in accordance with the following equation (6).

$$M = \alpha \times (Up60) - \beta \times (F0) \quad (6)$$

Figure 8D:
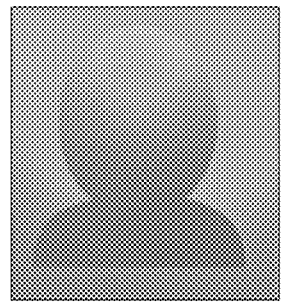

A composited reflection characteristic map in this case is shown in FIG. 8D. Note that, in the equation (6), the system control unit 50 sets α to a larger value as the facial region 501 becomes darker relative to a predetermined reference luminance of a face, and sets β to a larger as the bright part of the face becomes brighter relative to the reference luminance.

The above describes the selection of reflection characteristic maps and the determining of compositing characteristics (values and signs of coefficients α and β) according to a relighting mode.

In step S405, the system control unit 50 sets the compositing parameters (the reflection characteristic maps and compositing characteristics) determined in step S404 in the reflection characteristic map compositing unit 301.

The above describes compositing parameter setting processing that is executed for the reflection characteristic map compositing unit 301 by the system control unit 50. Afterwards, the reflection characteristic map compositing unit 301 performs processing for compositing the reflection characteristic maps based on the set compositing parameters. The reflection characteristic map compositing unit 301 outputs the composited reflection characteristic map to the fitting processing unit 302. The fitting processing unit 302 performs fitting processing on the composited reflection characteristic map, with reference to the captured image (Rin, Gin, Bin).

Figure 9A:
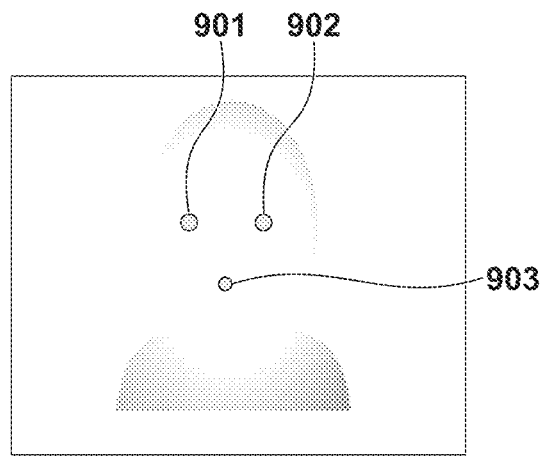
FIGS. 9A to 9C are diagrams illustrating fitting processing.
Figure 9B:
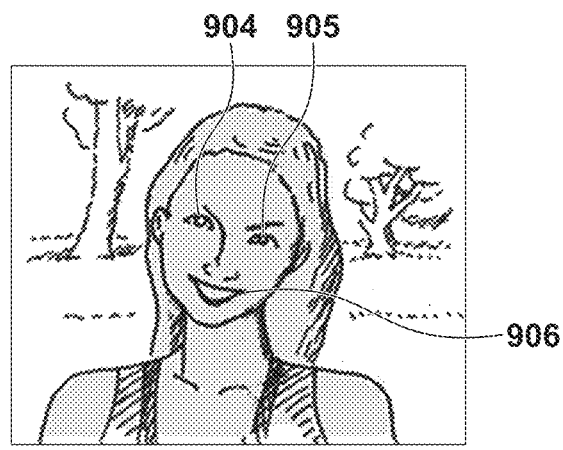
Figure 9C:
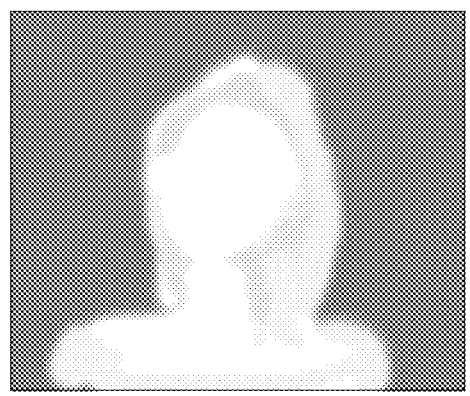

The following describes the fitting processing with reference to FIGS. 9A to 9C. FIG. 9A shows a composited reflection characteristic map. In the reflection characteristic map, characteristic points 901 to 903 that correspond to the positions of the eyes and the mouth are set in advance. FIG. 9B shows a captured image (Rin, Gin, Bin). First, the fitting processing unit 302 geometrically deforms (geometrically converts) the reflection characteristic map, based on positions 904 to 906 of the characteristic points (eyes, mouth, etc) of the object of the captured image. Specifically, the fitting processing unit 302 acquires coordinate positions of the characteristic points (eyes, mouth, etc) of the object of the captured image from the face detection unit 113 (FIG. 1). Here, the fitting processing unit 302 performs enlargement, down-sizing and rotation on the reflection characteristic map, such that the positional relationship between characteristic points 901 to 903 and positions 904 to 906 in alignment. Through this, it is possible to compensate for the difference between the average facial shape model of the reflection characteristic map and the shape of the object included in the captured image.

Next, the fitting processing unit 302 uses the captured image as a reference image and applies a joint bilateral filter to the reflection characteristic map. Through this, it is possible to apply smoothing processing to the reflection characteristic map in a state in which the edges of the reference image are saved. The result of applying the joint bilateral filter is shown in FIG. 9C. The fitting processing unit 302 outputs a reflection characteristic map Mf, which is obtained through the application of the joint bilateral filter, to the virtual light source reflection component calculation unit 303.

Note that, as in the case where the relighting mode is the "flat correction mode" and a strobe is not emitting light, there are cases in which compositing processing for compositing a plurality of reflection characteristic maps is not performed. In this case, as shown above in the equation (5), the reflection characteristic map compositing unit 301 outputs a reflection characteristic map that is obtained by multiplying the selected reflection characteristic map by coefficients to the fitting processing unit 302. Then, in a similar manner as a case where compositing processing is performed, the fitting processing unit 302 performs the fitting processing described above on the reflection characteristic map that is output from the reflection characteristic map compositing unit 301.

The virtual light source reflection component calculation unit 303, in accordance with an equation (7), multiplies the captured image (Rin, Gin, Bin) by the reflection characteristic map Mf that has undergone fitting processing. Through this, the reflection color components (Ra, Ga, Ba) of the object due to the virtual light source are calculated.

$$Ra = Mf \times Rin$$

$$Ga = Mf \times Gin$$

$$Ba = Mf \times Bin \quad (7)$$

The virtual light source reflection component calculation unit 303 outputs the calculated reflection components (Ra, Ga, Ba) of the object resulting from the virtual light source to the virtual light source addition processing unit 304.

The virtual light source addition processing unit 304, in accordance with an equation (8), adds the reflection components (Ra, Ga, Ba) of the virtual light source to an object region.

$$Rout = Rin + Ra$$

$$Gout = Gin + Ga$$

$$Bout = Bin + Ba \quad (8)$$

As described above, according to the first embodiment, the digital camera 100 composites a plurality of reflection characteristic maps, generates reflection components of the object included in the image based on the reflection characteristics shown in the composited reflection characteristic map, and adds the generated reflection components to the image. Through this, it becomes possible to reduce the processing load of relighting which uses a plurality of virtual light sources.

Note that, in the present embodiment, description is given taking the case where the digital camera 100 has reflection characteristic maps in five stages in the left-right direction and two stages in the up-down direction as an example, but the digital camera 100 is not limited to having the reflection characteristic maps in this way. For example, the digital camera 100 may hold reflection characteristic maps of more patterns, such as ten stages in both the up-down and left-right directions. Also, in regards to the pairs of left-right symmetrical reflection characteristic maps, such as right side 60 degrees and left side 60 degrees, just one may be prepared and the digital camera 100 may horizontally reverse the reflection characteristic map according to the state of the object and utilize the reversed map.

Also, the present embodiment describes an example of addition and subtraction as the computation for compositing the reflection characteristic maps, but the computation when compositing a reflection characteristic map is not limited to addition and subtraction. For example, the compositing computation may include multiplication or division, and may include color conversion processing such as performing compositing after changing the ratio of RGB color components.

Also, the present embodiment describes the case where four modes, namely, the "oblique light correction mode", the "top light correction mode", the "back light correction mode" and the "flat correction mode", are provided as relighting modes. However, the relighting modes are not limited to these four modes. Any kind of mode may be prepared as long as a configuration in which compositing parameters of the reflection characteristic maps are determined according to the relighting mode is provided.

Also, the present embodiment describes a configuration in which the relighting mode is determined according to the luminance distribution on the object, but the determination of the relighting mode may be performed with another method. For example, a configuration is possible in which the relighting mode is determined (selected) in accordance with a user instruction.

Also, the present embodiment describes an example in which two reflection characteristic maps are composited, but any number of reflection characteristic maps may be composited as long as a configuration in which a plurality of reflection characteristic maps are composited is provided. For example, a configuration in which three reflection characteristic maps are composited in order to re-create the lighting of three lamps is also possible.

Second Embodiment

The first embodiment described a configuration in which the relighting mode is selected according to the situation of an object at the time of image capture, and the compositing parameters of the reflection characteristic maps are controlled according to the relighting mode. The second embodiment describes a configuration in which relighting by a virtual light source is performing according to a user instruction when developing a raw image that was recorded to the recording medium 112. The basic configuration of the digital camera 100 in the second embodiment is similar to that in the first embodiment (See FIGS. 1 to 3). The following primarily describes points that are different to the first embodiment.

The digital camera 100 initially records a raw image to the recording medium 112, rather than immediately performing processing for developing an image captured by the image capturing unit 103 with the image processing unit 105. Then, once an image has been selected by a user operation, the digital camera 100 reads out raw image data from the recording medium 112 and performs image processing with use of the image processing unit 105.

In the present embodiment, the method of determining the compositing parameters of the reflection characteristic maps that are set in the reflection characteristic map compositing unit 301 in FIG. 3 differs from the first embodiment. The following describes the method of determining compositing parameters with reference to FIG. 10.

Figure 10:
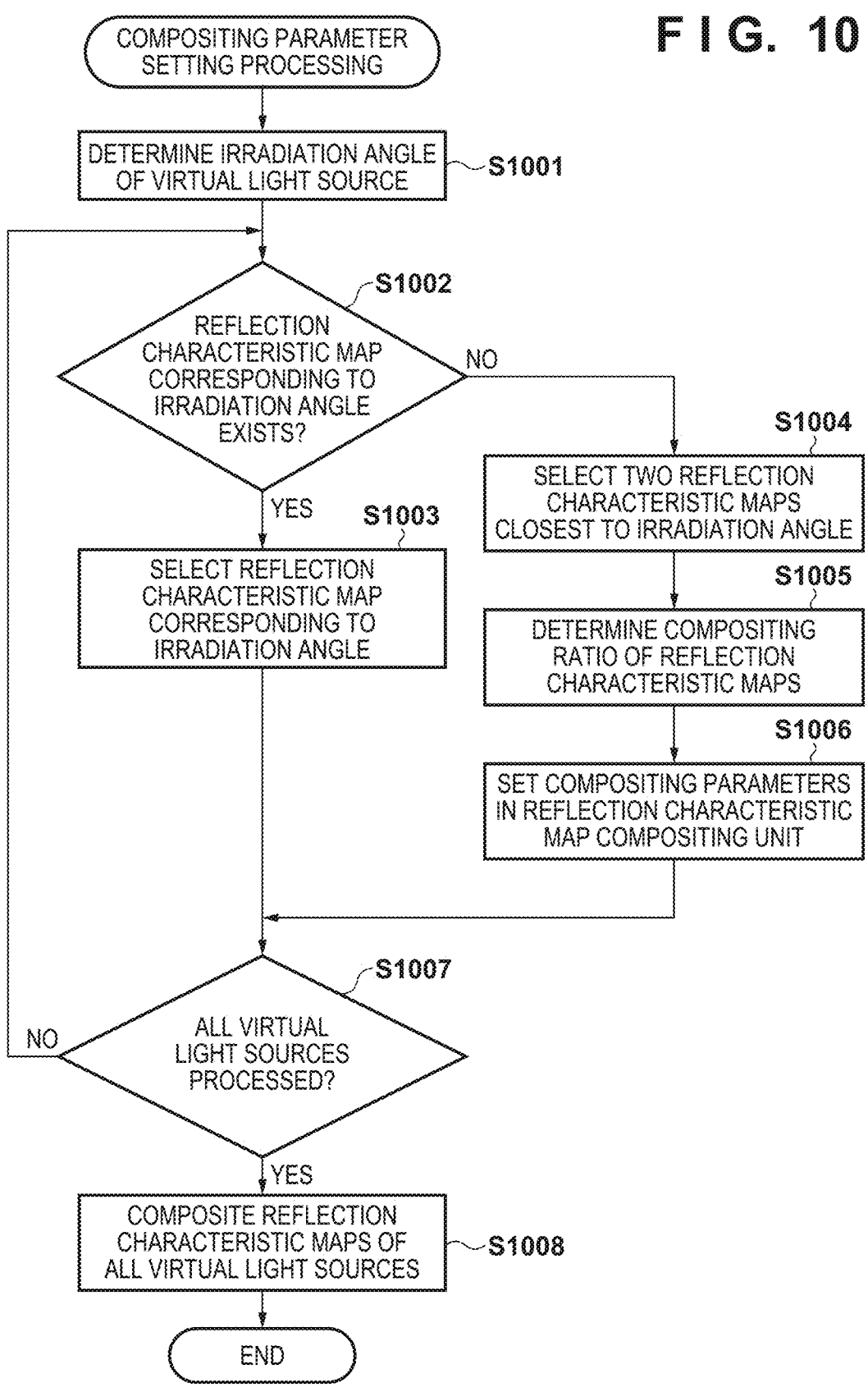
FIG. 10 is a flowchart of the compositing parameter setting processing that is performed for the reflection characteristic map compositing unit 301 by the system control unit 50, according to a second embodiment.

FIG. 10 is a flowchart of the compositing parameter setting processing that is performed for the reflection characteristic map compositing unit 301 by the system control unit 50, according to the second embodiment. The processing of this flowchart starts when an image to be developed (image to undergo relighting) is selected by a user.

In step S1001, the system control unit 50 determines the irradiation angle of virtual light sources that are to be used in relighting. The irradiation angle is determined in accordance with a user operation. An example of a user interface for a user operation that installs virtual light sources is shown in FIG. 11.

Figure 11:
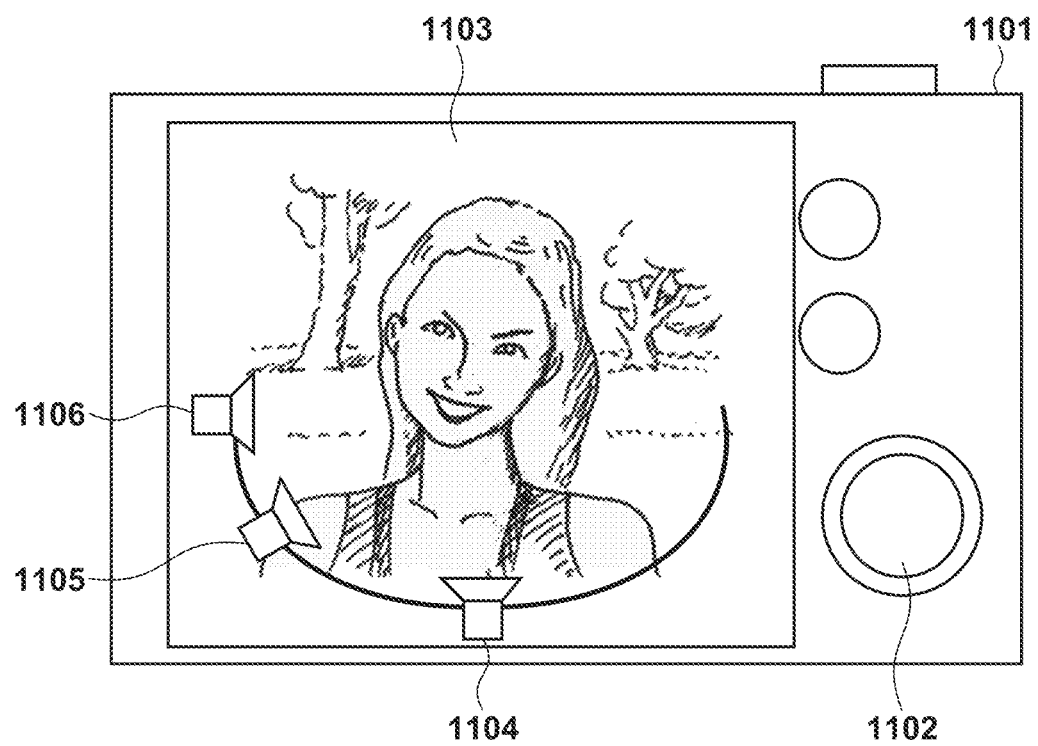
FIG. 11 is a diagram showing a user interface for a user operation for installing virtual light sources.

In FIG. 11, reference numeral 1101 denotes camera casing, 1102 denotes an operation unit and 1103 denotes a display unit. The operation unit 1102 is included in the operation unit 120 in FIG. 1. The display unit 1103 is included in the display unit 109 in FIG. 1. When an image to undergo relighting is selected by the user, the system control unit 50 displays the selected image on the display unit 1103. Reference numerals 1104 to 1106 show the positions of the set virtual light sources. The digital camera 100 performs relighting processing based on the position and direction of these virtual light sources. The position of a virtual light source is determined by a touch operation made by a user. As shown by reference numerals 1104 to 1106, it is possible for the user to install a plurality of virtual light sources in any position. When the position of the virtual light source is determined, the system control unit 50 determines the irradiation angle such that the virtual light source is irradiated toward the center of the main object from the position of the set virtual light source. A plurality of virtual light sources can be installed, and FIG. 11 shows a case where three lamps are installed, namely the virtual light sources 1104, 1105 and 1106. The system control unit 50, after determining the irradiation angle of the virtual light sources, executes the processing of steps S1002 to S1007 for each of the installed plurality of virtual light sources.

In step S1002, the system control unit 50 determines whether or not a reflection characteristic map that corresponds to the irradiation angle is recorded in the nonvolatile memory 121. In the present embodiment, similar to the first embodiment, the seven types of reflection characteristic maps shown in FIG. 6 are recorded in the nonvolatile memory 121. In the example in FIG. 11, the virtual light source 1104 is in front of the object, and "F0" of FIG. 6 corresponds to the irradiation angle. The virtual light source 1106 is positioned at 90 degrees on the left side of the object, and "L90" in FIG. 6 corresponds to the irradiation angle. In the example of the virtual light sources 1104 and 1106, processing proceeds to step S1003 because corresponding reflection characteristic maps exist. On the other hand, the virtual light source 1105 irradiates from 75 degrees on the left side of the object. Processing proceeds to step S1004 because a reflection characteristic map that corresponds to this irradiation angle does not exist.

In step S1003, the system control unit 50 selects the reflection characteristic map that corresponds to the irradiation angle of the virtual light source. In the example of FIG. 11, "F0" in FIG. 6 is selected for the virtual light source 1104 and "L90" in FIG. 6 is selected for the virtual light source 1106.

In step S1004, the system control unit 50 selects two reflection characteristic maps that are closest to the irradiation angle of the virtual light source (one whose irradiation angle is larger and one whose irradiation angle is smaller than the determined irradiation angle). In the example in FIG. 11, because the virtual light source 1105 has an irradiation angle of 75 degrees on the left side, the two reflection characteristic maps of left side 90 degrees (L90) and left side 60 degrees (L60), which are close to 75 degrees on the left side, are selected.

In step S1005, the system control unit 50 determines the compositing ratio to be used for the compositing of two selected reflection characteristic maps. In the case of the virtual light source 1105, because left side 75 degrees is an angle between left side 90 degrees and left side 60 degrees, the reflection characteristic map of left side 90 degrees (L90) and the reflection characteristic map of left side 60 degrees (L60) are composited at a ratio of 1-to-1. That is, by performing compositing processing of the reflection characteristic maps in accordance with an equation (9), it is possible to generate a reflection characteristic map for irradiating light from approximately 75 degrees on the left side.

$$M=0.5\times(L90)+0.5\times(L60) \qquad (9)$$

In step S1006, the system control unit 50 sets the compositing parameters (reflection characteristic maps and compositing ratio) in the reflection characteristic map compositing unit 301.

In step S1007, the system control unit 50 determines whether or not processing has been completed for all of the virtual light sources. In the example in FIG. 11, because three virtual light sources are set, the system control unit 50 determines whether or not the processing of steps S1002 to S1006 has been completed in relation to the three virtual light sources. If processing for all of the virtual light sources has been completed, the processing proceeds to step S1008, and if not, the processing returns to step S1002.

In step S1008, the system control unit 50 sets the reflection characteristic map compositing unit 301 such that the selected or generated reflection characteristic maps of all of the virtual light sources are composited through addition. In the example in FIG. 11, the system control unit 50 sets the reflection characteristic map compositing unit 301 to composite the three reflection characteristic maps that correspond to the virtual light sources 1104 to 1106 and generate one composite reflection characteristic map.

The above describes compositing parameter setting processing that is executed for the reflection characteristic map compositing unit 301 by the system control unit 50. Afterwards, the reflection characteristic map compositing unit 301 performs processing for compositing the reflection characteristic maps based on the set compositing parameters. The subsequent processing is similar to the first embodiment.

As in the above description, according to the second embodiment, the digital camera 100 determines the irradiation angle of a virtual light source in accordance with a user operation when relighting processing is performed. Then, the digital camera 100 generates a reflection characteristic map that corresponds to the determined irradiation angles by compositing reflection characteristic maps prepared in advance. Through this, it becomes possible to generate a reflection characteristic map of a desired irradiation angle with a comparatively small processing load.

Note that in the present embodiment, the final reflection characteristic map is generated by compositing reflection characteristic maps held in advance. However, apart from reflection characteristic maps held in advance, it is also possible to adopt a configuration in which a reflection characteristic map calculated from the shape of an object acquired at the time of image capturing is utilized. In this case, the digital camera 100 acquires the shape of the object and generates a reflection characteristic map based on that shape. Also, the digital camera 100 may be configured such that reflection characteristic maps held in advance and reflection characteristic maps based on the shape of an object are selectively utilized. Specifically, the digital camera 100 calculates the normal from the distance information acquired from the distance measuring sensor 124 and generates a reflection characteristic map based on the normal, the position, direction and reflectance of a virtual light source, and the like. A reflection characteristic map generated with use of the distance measuring sensor 124 has increased accuracy, but takes time to generate. In view of this, it is possible to adopt a method in which reflection characteristic maps prepared beforehand are composited and utilized if the emphasis is on speed such as in the case of a preview, and a reflection characteristic map generated using the distance measuring sensor 124 is utilized if the emphasis is on accuracy such as in the case of a final image.

Also, there are cases in which the object distances are too far apart and distance information cannot be acquired, and cases of conditions in which the accuracy of the normal deteriorates due to reasons such as the face being small or being too dark or too bright. In such cases, it is also possible to adopt a configuration in which reflection characteristic maps prepared beforehand are switched to and utilized, even in the case where accuracy is prioritized.

Third Embodiment

Figure 13:
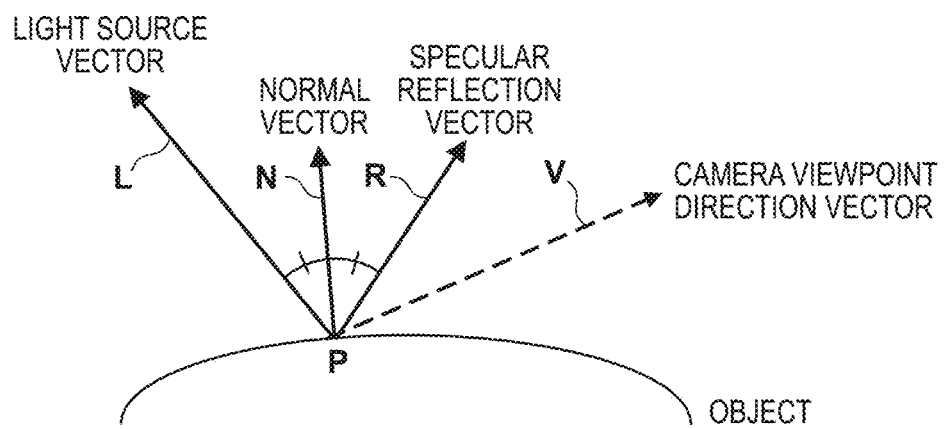
FIG. 13 is a diagram illustrating processing for generating a diffuse reflection map D and a specular reflection map S.

The following describes the third embodiment with reference to FIGS. 12 and 13. The present embodiment describes an example in which a plurality of reflection characteristic maps are generated inside a camera according to the object and composited. Furthermore, in the present embodiment, two maps having different attributes, namely a diffuse reflection characteristic map and a specular reflection characteristic map, are generated and composited.

In the present embodiment, the overall configuration of the digital camera 100 is similar to that described in the first embodiment (FIGS. 1 and 2), and as such description thereof is omitted. In the present embodiment, the configuration of the relighting processing unit 202 is different from that in the first embodiment and the second embodiment. The following primarily describes points that are different to the first embodiment and second embodiment.

The configuration of the relighting processing unit 202 in the present embodiment is shown in FIG. 12. In FIG. 12, reference numeral 1201 denotes a normal calculation unit for calculating a normal, and 1202 denotes a reflection characteristic map generation unit that generates a reflection characteristic map of a virtual light source, based on normal information and virtual light source direction information. Reference numeral 1203 denotes a reflection characteristic map compositing unit that composites a plurality of reflection characteristic maps, and 1204 denotes a virtual light source reflection component calculation unit that calculates the reflection components of a virtual light source based on the composited reflection characteristic map.

The following describes the operations of the relighting processing unit 202 of the above configuration. The normal calculation unit 1201 calculates a normal map from the object distance information acquired from the distance measuring sensor 124 (FIG. 1). The object distance information is two dimensional distance information obtained in pixel units of a captured image. In regards to the method of generating a normal map from object distance information, any well-known technique may be used.

The reflection characteristic map generation unit 1202 installs a virtual light source with respect to the object, and calculates a diffuse reflection map D of the object from the relationship between the normal and the direction of the virtual light source and a specular reflection map S.

The diffuse reflection map D is calculated with the following equation, where N is a normal vector of the object at a pixel of interest P of the object and L is a direction vector of the virtual light source from the pixel of interest P as shown in FIG. 13, and K is the distance between the virtual light source and the object (pixel of interest). Note that vectors L and N are given as having been normalized.

$$D_i = \frac{L \cdot N}{K^2}$$

A plurality of virtual light sources that provide diffuse reflection can be installed, and $D_i$ shows that the diffuse reflection characteristic map corresponds to the i-th virtual light source. Through computation of the above equation, the diffuse reflection component becomes larger as the direction of the direction vector L of the virtual light source approaches the direction of the normal vector N and the distance K between the object and the virtual light source becomes shorter.

Also, the specular reflection map S is calculated with the following equation, where R is a direction vector of specular reflection and V is a direction vector (direction of the line of sight) of the camera from the position of the object (pixel of interest P) as shown in FIG. 13. That is, the specular reflection component becomes larger as the direction of the camera approaches the direction of specular reflection.

$$S_j = (R \cdot V)^m$$

Any known calculation method that has been proposed may be used in the calculation of the direction vector R of the specular reflection. Here, if it is assumed that the angle of incidence is the vector of the object position (pixel of interest P) from the position of the virtual light source, the vector in the case where light is reflected at the same angle as the angle of incidence to the reflective surface is given as the direction vector R of specular reflection. Also, reference numeral m denotes a brightness coefficient that shows a spatial spread of specularly reflected light, and the specular reflection becomes steeper when this value increases.

A plurality of virtual light sources that provide specular reflection can be installed, and Sj shows that the specular reflection characteristic map corresponds to the j-th virtual light source.

The reflection characteristic map generation unit 1202 installs a plurality of virtual light sources that provide specular reflection and diffuse reflection based on the object evaluation value acquired by the evaluation value generation unit 209 (FIG. 2). For example, in the case of oblique light in which the brightness of the object differs on the left and right as shown in FIG. 5A, a virtual light source that irradiates the object with light from the left and a virtual light source that irradiates the object with light from the right are installed. In the case where the brightness of the object differs on the top and bottom as shown in FIG. 5B, a virtual light source that irradiates the object with light from the top and a virtual light source that irradiates the object with light from the bottom are installed.

As described above, the reflection characteristic map generation unit 1202 calculates the diffuse reflection map D and the specular reflection map S for the virtual light sources that are installed at a plurality of positions, and outputs the calculated maps to the reflection characteristic map compositing unit 1203.

The reflection characteristic map compositing unit 1203 performs an addition/subtraction calculation at a ratio that depends on the shadow state of the object with regard to the plurality of diffuse reflection maps D and specular reflection maps S that are input, based on the following equation, and generates a final reflection characteristic map M.

$$M = \Sigma_i (\alpha_i \times D_i) + \Sigma_j (\beta_j \times S_j)$$

Here, α and β are weights of the addition/subtraction calculation and can also take negative values. By setting α or β to a negative value, it is possible to configure a specified virtual light source as subtracted light.

For example, in a case of an oblique light scene in which the left side when facing the object is bright and the right side is dark, such as with the object shown in FIG. 5A, the α or β value of a virtual light source that irradiates light from the left side towards the object is set to a negative value to reduce light. Also, the α value of a virtual light source that irradiates from the right side is enlarged to expose the dark portion to intense diffused light. By controlling the compositing ratio of the plurality of diffuse reflection maps and specular reflection maps in this way, the reflection characteristic map M is generated according to the state of the object. The generated reflection characteristic map M is output to the virtual light source reflection component calculation unit 1204.

The virtual light source reflection component calculation unit 1204 multiplies the captured images (Rin, Gin, Bin) by the reflection characteristic map M. Reflection color components (Ra, Ga, Ba) of the object due to the virtual light sources are thereby calculated. This is represented in the following equations.

$$Ra = M \times R\text{in}$$

$$Ga = M \times G\text{in}$$

$$Ba = M \times B\text{in}$$

The reflection components (Ra, Ga, Ba) due to the virtual light source calculated as described above are output to the virtual light source addition processing unit 304. The processing of the virtual light source addition processing unit 304 is similar to the first embodiment and as such description thereof is omitted here.

As described above, according to the third embodiment, the digital camera 100, in a case where relighting processing is performed, generates reflection characteristic maps that correspond to a plurality of virtual light sources that have been set. The digital camera 100 then obtains a desired reflection characteristic map through weighted compositing of the generated plurality of reflection characteristic maps. Fast processing thereby becomes possible as a result of not computing the reflection color components corresponding to each of the plurality of virtual light sources.

Note that, in the description above, a final reflection characteristic map is calculated by compositing all of the diffuse reflection maps D and the specular reflection maps S, but a configuration is also possible in which a composite map is generated respectively for the diffuse reflection characteristic maps and the specular reflection maps, and the final reflection color components are calculated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-211209, filed Oct. 31, 2017 and No. 2018-197847, filed Oct. 19, 2018, which are hereby incorporated by reference herein in their entirety.

What is claimed is:

1. An image processing apparatus comprising:
   at least one processor and/or circuit configured to function as following units:
   a compositing unit configured to obtain composited reflection characteristic data by performing compositing processing for compositing first reflection characteristic data that shows a reflection characteristic of a first virtual light source on a predetermined object included in an input image and second reflection characteristic data that shows a reflection characteristic of a second virtual light source on the predetermined object, before adding a virtual light source effect to the input image;
   a generation unit configured to generate a reflection component relating to an object that is included in the input image, based on a reflection characteristic shown by the composited reflection characteristic data obtained by the compositing processing;and
   an addition unit configured to add, to the input image, the reflection component generated by the generation unit.

2. The image processing apparatus according to claim 1, wherein the compositing unit selects the first reflection characteristic data and the second reflection characteristic data from a plurality of reflection characteristic data.

3. The image processing apparatus according to claim 2, wherein the at least one processor and/or circuit is further configured to function as a determination unit configured to determine a correction mode, and
   wherein the compositing unit selects the first reflection characteristic data and the second reflection characteristic data based on the correction mode.

4. The image processing apparatus according to claim 3, wherein the determination unit determines the correction mode based on a luminance of the object included in the input image.

5. The image processing apparatus according to claim 2, wherein the compositing unit selects the first reflection characteristic data and the second reflection characteristic data in accordance with a user instruction.

6. The image processing apparatus according to claim 1, wherein the compositing unit, in the compositing processing, multiplies the first reflection characteristic data by a first coefficient and multiplies the second reflection characteristic data by a second coefficient.

7. The image processing apparatus according to claim 6, wherein the compositing unit determines the first coefficient and the second coefficient based on a luminance of the object included in the input image.

8. The image processing apparatus according to claim 1, wherein the at least one processor and/or circuit is further configured to function as a correction unit configured to correct the composited reflection characteristic data so as to compensate for a difference between a shape of the predetermined object and a shape of the object included in the input image, and
   wherein the generation unit generates the reflection component based on the composited reflection characteristic data that has undergone the correction.

9. The image processing apparatus according to claim 8, wherein the composited reflection characteristic data includes a reflection characteristic image that expresses a reflection characteristic at each position on the predetermined object, and
   wherein the correction unit geometrically converts the reflection characteristic image so as to compensate for the difference between the shape of the predetermined object and the shape of the object included in the input image.

10. The image processing apparatus according to claim 9, wherein the correction unit further performs smoothing processing on the reflection characteristic image based on the input image.

11. An image capturing apparatus comprising:
    the image processing apparatus according to claim 1; and
    an image capturing unit configured to generate the input image.

12. An image processing method executed by an image processing apparatus, comprising:
    obtaining composited reflection characteristic data by performing compositing processing for compositing first reflection characteristic data that shows a reflection characteristic of a first virtual light source on a predetermined object included in an input image and second reflection characteristic data that shows a reflection characteristic of a second virtual light source on the predetermined object, before adding a virtual light source effect to the input image;
    generating a reflection component relating to an object that is included in the input image, based on a reflection characteristic shown by the composited reflection characteristic data obtained by the compositing processing; and
    adding the reflection component to the input image.

13. A non-transitory computer-readable storage medium which stores a program for causing a computer to execute an image processing method comprising:
    obtaining composited reflection characteristic data by performing compositing processing for compositing first reflection characteristic data that shows a reflection characteristic of a first virtual light source on a predetermined object included in an input image and second reflection characteristic data that shows a reflection characteristic of a second virtual light source on the predetermined object, before adding a virtual light source effect to the input image;

generating a reflection component relating to an object that is included in the input image, based on a reflection characteristic shown by the composited reflection characteristic data obtained by the compositing processing; and adding the reflection component to the input image.

\* \* \* \* \*